March 31, 1959  F. M. McLAUGHLIN  2,879,605
BEAD MEASURING DEVICE
Filed May 1, 1957  5 Sheets-Sheet 1

INVENTOR
Francis M. McLaughlin
BY  W. A. Fraser
ATTORNEY

March 31, 1959 F. M. McLAUGHLIN 2,879,605
BEAD MEASURING DEVICE
Filed May 1, 1957 5 Sheets-Sheet 2

INVENTOR
Francis M. McLaughlin
BY W. A. Fraser
ATTORNEY

March 31, 1959

F. M. McLAUGHLIN 2,879,605

BEAD MEASURING DEVICE

Filed May 1, 1957

INVENTOR
Francis M. McLaughlin

BY W. A. Fraser

ATTORNEY

March 31, 1959

F. M. McLAUGHLIN 2,879,605

BEAD MEASURING DEVICE

Filed May 1, 1957

INVENTOR
Francis M. McLaughlin
BY W. A. Fraser
ATTORNEY

March 31, 1959

F. M. McLAUGHLIN 2,879,605

BEAD MEASURING DEVICE

Filed May 1, 1957

INVENTOR
Francis M. McLaughlin
BY
W. A. Fraser
ATTORNEY

United States Patent Office 2,879,605
Patented Mar. 31, 1959

2,879,605

BEAD MEASURING DEVICE

Francis Marion McLaughlin, Peninsula, Ohio, assignor to The Firestone Tire & Rubber Company, Akron, Ohio, a corporation of Ohio Application May 1, 1957, Serial No. 656,456

8 Claims. (Cl. 33—178)

This invention relates to measuring apparatus and, more particularly, to apparatus for measuring tire bead grommets.

Pneumatic vehicle tires are commonly provided with slightly flexible, but substantially inextensible, wire grommets usually formed of high carbon steel to reinforce the bead portions of the tire. Because of the high rates of acceleration and braking power of modern automobiles, the tire bead portions have a tendency to slip relative to the rim on which they are mounted. To minimize such undesirable slippage, tire manufacturers construct the bead grommets to close tolerances to provide for a tight fit between the tire bead portions and the rim. Accurate measurement of bead grommets to determine whether their size conforms to specified tolerances is attended with considerable difficulty. Conventional conical gauges normally used in measuring the inside diameter of circular objects may not be read with sufficient precision to satisfy the requirement for accuracy. Moreover, accurate measurement of a bead grommet in its normal circular configuration with conventional inside calipers is not practicable because the grommet is too flexible to permit precise setting of the calipers.

To overcome the disadvantages of prior art devices, it is an object of this invention to provide an improved apparatus for quickly measuring slightly flexible, normally circular tire bead grommets without permanently deforming the grommets from their normal configuration, which apparatus is highly accurate and requires a minimum of relative movement between its parts during the measuring operation.

It is an additional object of this invention to provide such an apparatus which may be used for the measurement of a wide range of sizes of tire bead grommets.

It is a further object of this invention to provide such an apparatus embodying a split circular measuring surface and a conventional linear distance indicator for directly measuring the difference between the diameters of the tire bead grommet to be measured and the circular gauge surface.

Broadly described, the invention includes an apparatus for measuring slightly flexible, normally circular tire bead grommets, which apparatus includes a gauge comprising a plurality of radial segments having equal arcuate faces together forming a circular grommet engaging surface slightly smaller in diameter than the grommet to be measured, means connecting the segments for relative radially outward movement to provide an expanded grommet engaging surface, indicator means fixed with respect to one of the segments, means for actuating said indicator means, and means connected to the gauge for moving the actuating means in response to the expansion of the gauge a distance equal to the difference between the diameter of the circular surface and the diameter of a circle equal in circumference to the expanded surface.

The invention having been generally set forth, a preferred specific embodiment thereof for the accomplishment of one or more of the stated objects and others will now be described in detail with reference to the drawings in which:

Figure 6 is a fragmentary sectional view taken in the direction of the arrows along the line 6—6 of Figure 4.

Figure 1:
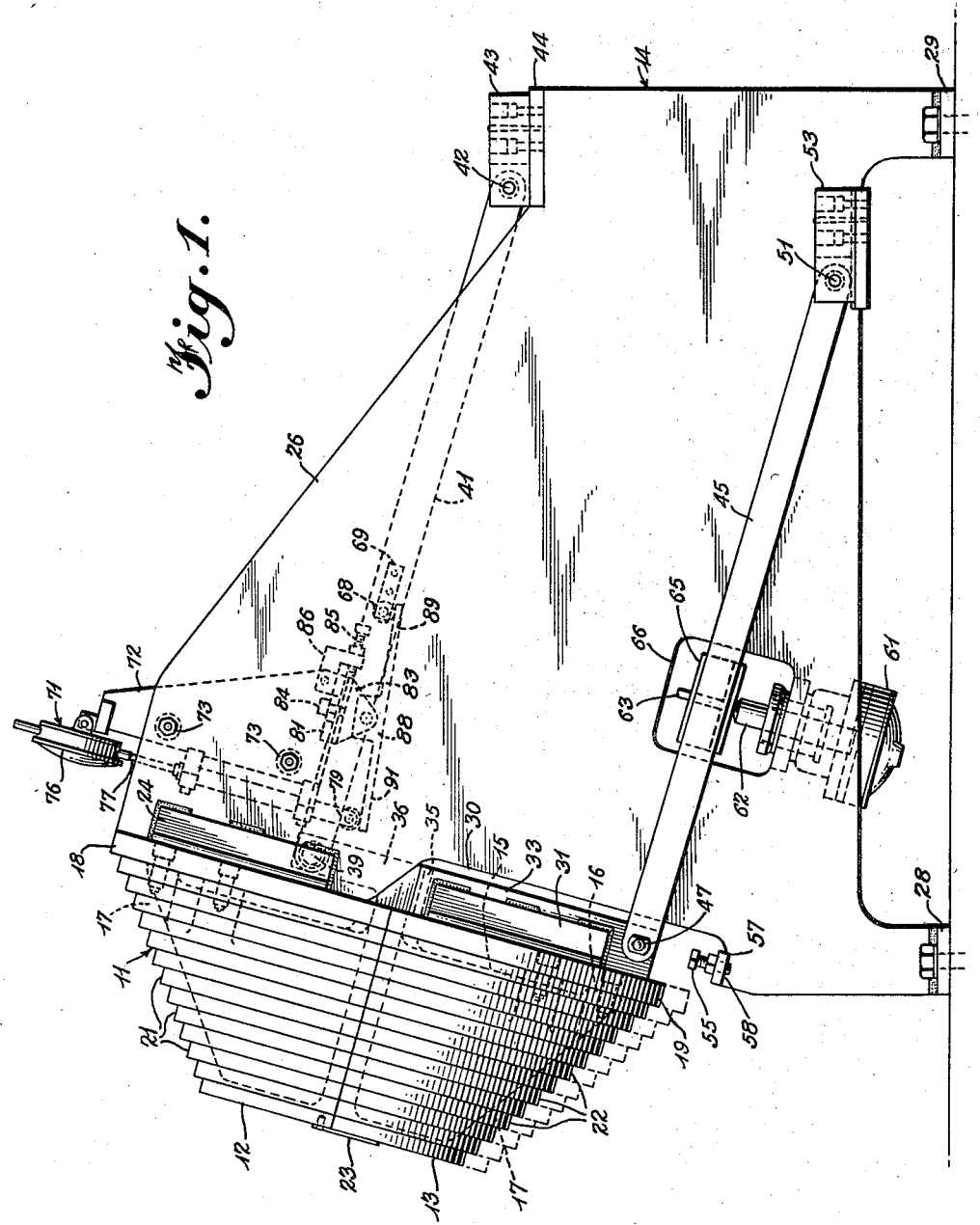
Figure 1 is a side elevation of a specific embodiment of the invention.
Figure 2:
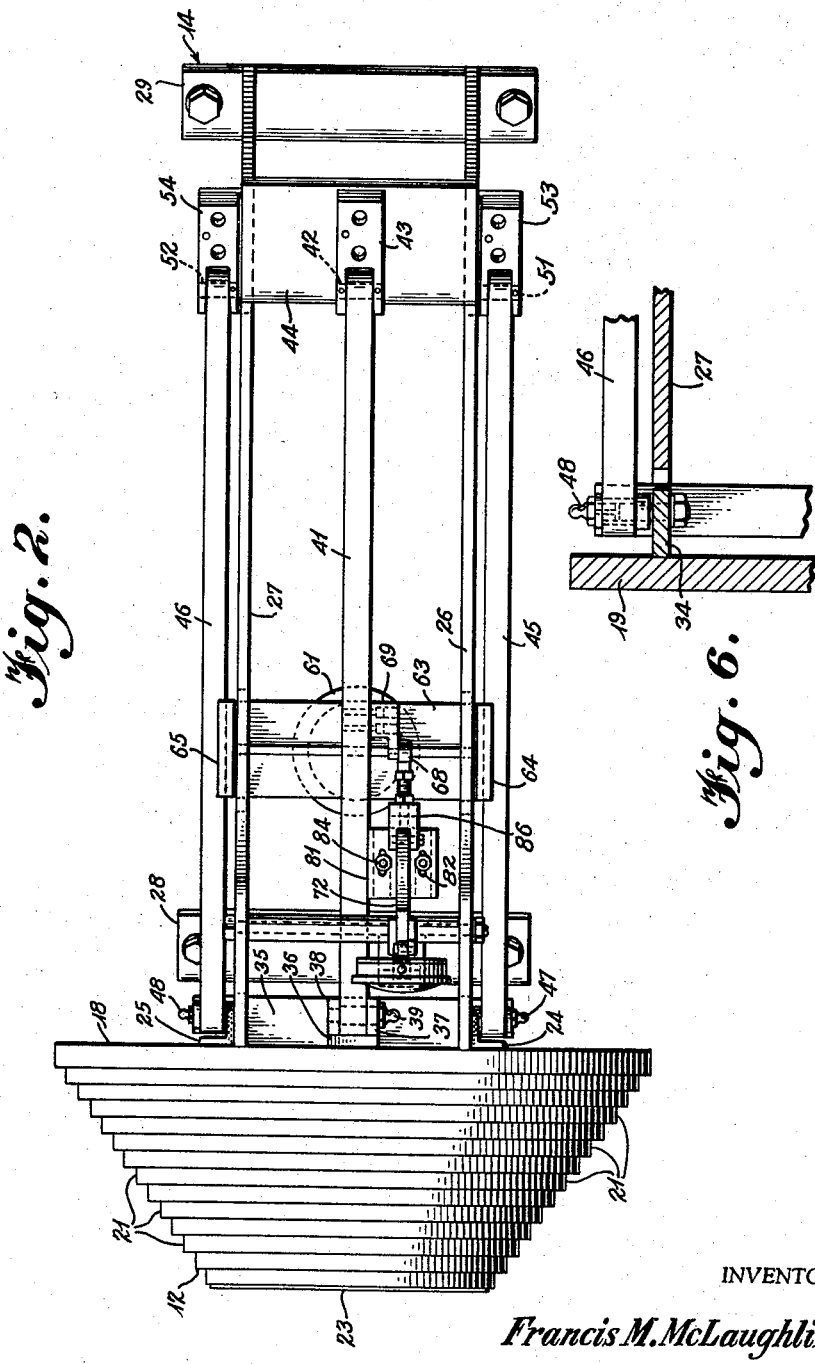
Figure 2 is a plan view of the apparatus shown in Figure 1.
Figure 3:
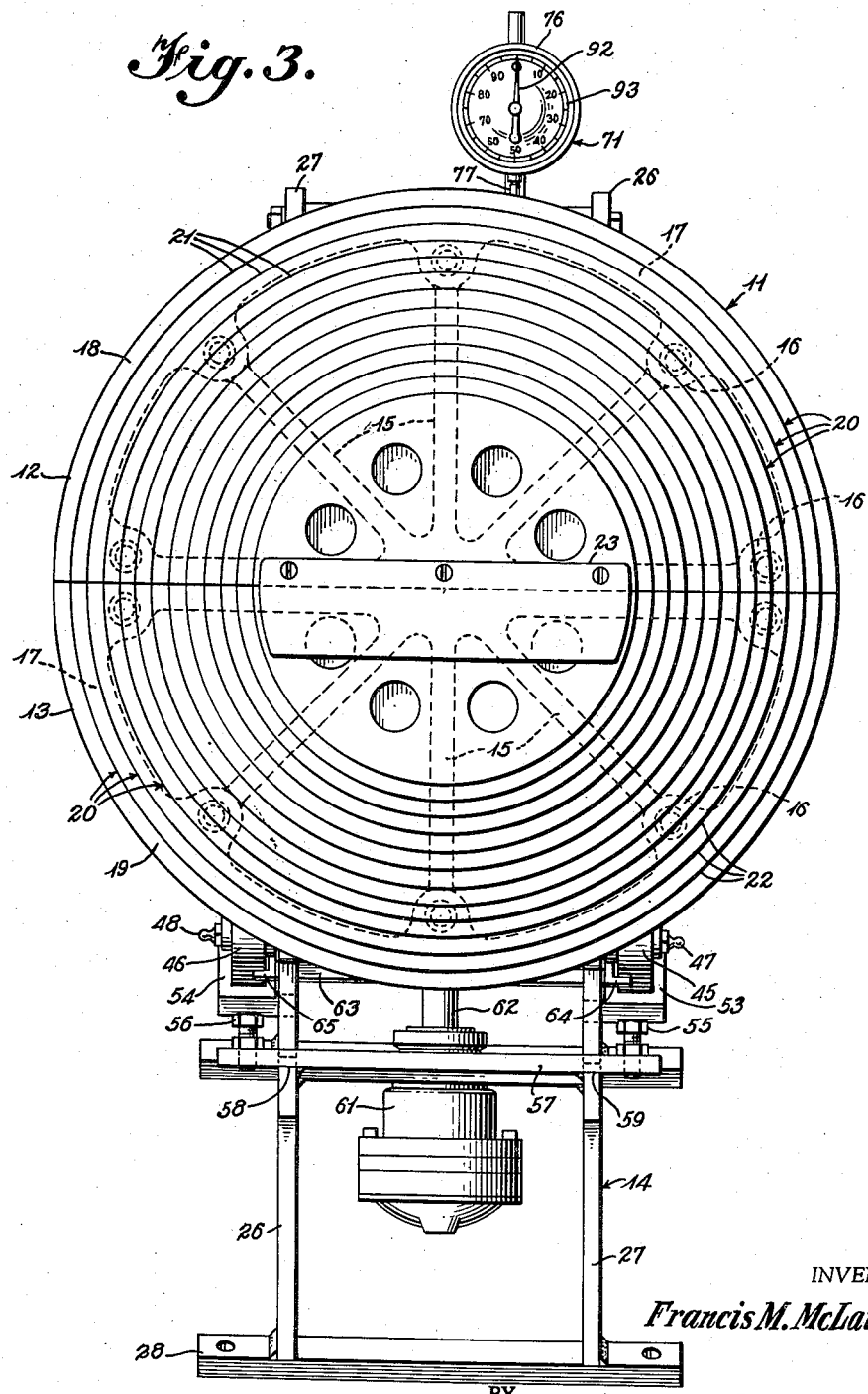
Figure 3 is a front elevation of the apparatus shown in Figure 1.

There is illustrated in Figure 1 a split gauge designated generally by the reference numeral 11, which gauge is generally frustoconical in exterior configuration and comprises a pair of independent and laterally separable gauge segments 12 and 13 carried by a supporting structure designated generally by the reference numeral 14. Each of the segments 12 and 13 is hollow with a plurality of circumferentially spaced, radial reinforcing ribs 15 which merge at the inner end of the segments into a plurality of drilled bosses 16 which are circumferentially spaced around the inner end of the exterior wall 17 of each of the segments 12 and 13. Bolted to the bosses at the inner ends of the segments 12 and 13 are semicircular plates 18 and 19, respectively. The plate 19 is identical to the plate 18 and diametrically opposed in abutting relationship thereto. Bolted to the outer face of the segment 12 is a safety plate 23 which extends over the outer face of the segment 13.

The segment 12 is provided with a plurality of axially spaced and stepped, generally semi-cylindrical faces 21 facing radially outwardly. The segment 13 is also provided with a plurality of axially spaced and stepped, generally semi-cylindrical faces 22 facing radially outwardly. The faces 22 are identical to the faces 21 and are diametrically opposed thereto so that, when the segments 12 and 13 are positioned together in abutting relationship, the faces 21 and 22 together form a plurality of axially spaced and stepped, generally cylindrical surfaces 20 facing radially outwardly. The radii of the faces 21 and 22, and thus the diameters of the composite cylindrical surfaces 20 formed thereby when the segments 12 and 13 are together, increase progressively from the outer end of the gauge 11 to the inner end thereof. The outermost of the cylindrical surfaces 20 has a diameter at least as small as and preferably slightly smaller than the diameter of the smallest bead grommet to be measured by the apparatus in order that such grommet may be mounted on such outermost cylindrical surface when the segments 12 and 13 are together. The innermost of the cylindrical surfaces 20 is preferably not materially smaller in diameter than the largest grommet to be measured by the apparatus. The intermediate surfaces 20 increase in diameter in small increments preferably but not necessarily uniformly between the outermost and the innermost surfaces. It is obvious that as many surfaces 20 as desired may be provided.

The plate 18 which covers the inner end of segment 12 has bolted thereto one leg of each of a pair of angles 24 and 25, the other legs of which are welded to a pair of up-standing support plates 26 and 27, respectively. The plates 26 and 27 are in turn welded to a pair of base plates 28 and 29 which lie flat on the floor supporting the apparatus and are bolted thereto.

Figure 4:
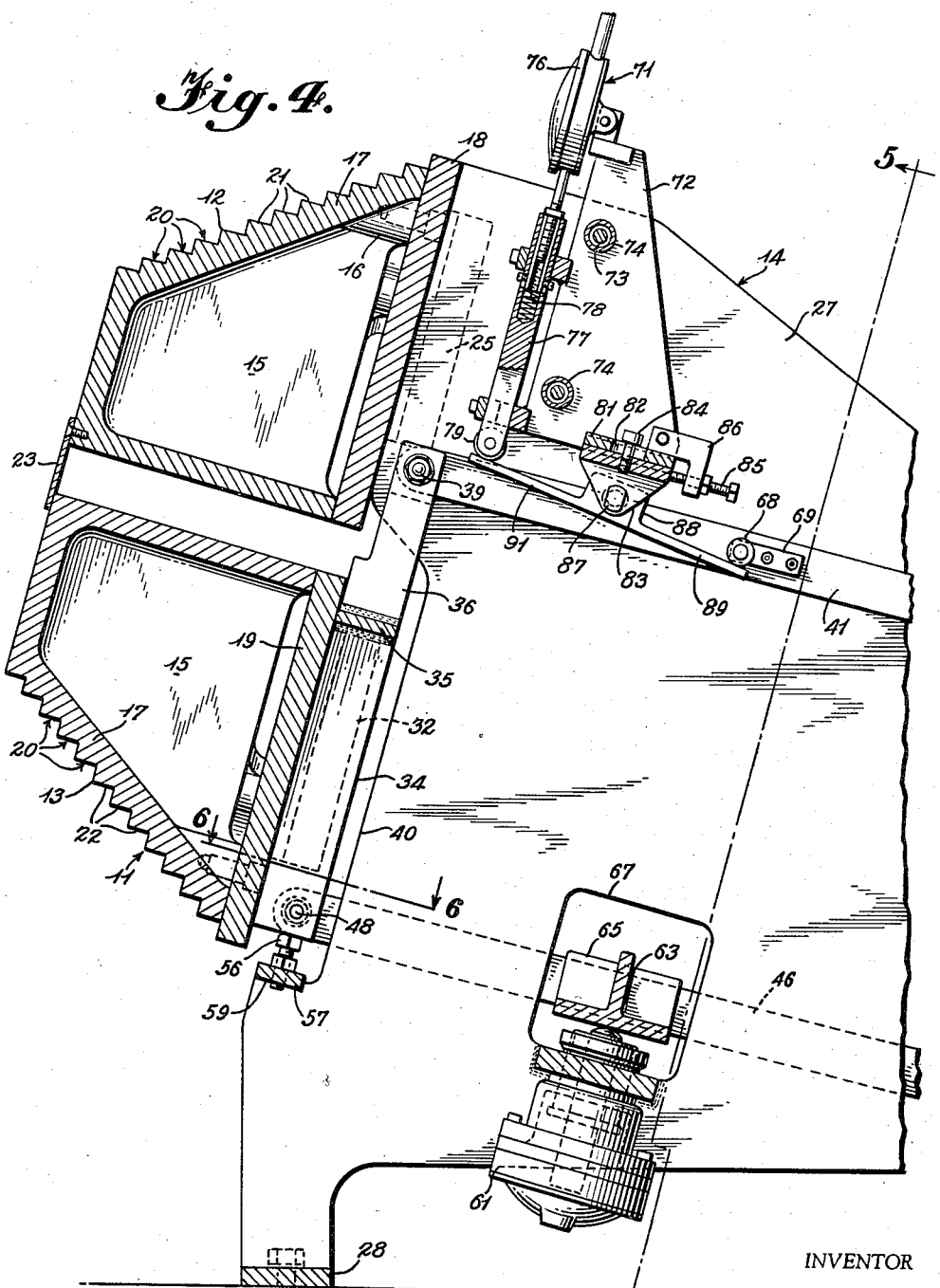
Figure 4 is a fragmentary vertical sectional view showing in detail the gauge segments and the indicator element, together with the actuating mechanism therefor.

The plate 19 covering the end of segment 13 is bolted to one leg of each of a pair of vertical angles 31 and 32. The opposite legs of the angles 31 and 32 are welded to a pair of vertical gusset plates 33 and 34 between the tops of which is welded a horizontal plate 35. As best seen in Figures 1 and 4, the plates 33, 34 and 35 are accommodated in a pair of recesses 30 and 40 in plates 26 and 27, respectively. Welded to the top of horizontal plate 35 is an up-standing bracket 36 having a bifurcated upper portion to form a pair of ears 37 and 38. Pivotally connected between the ears 37 and 38 by means of pivot pin 39 is one end of an elongated link 41. The opposite end of the elongated link 41 is pivotally connected by means of pivot pin 42 to a bifurcated bracket 43 which is bolted to a cross member 44 which in turn extends between support plates 26 and 27 and is welded thereto. The lower ends of each of the gusset plates 33 and 34 are pivotally connected, respectively, to one end of each of a pair of elongated links 45 and 46 by means of connections including pivot pins 47 and 48 (see Figure 6). The opposite ends of each of the elongated links 45 and 46 are respectively pivotally connected by means of pivot pins 51 and 52 to bifurcated brackets 53 and 54 which are respectively attached by welded connections to plates 26 and 27. With reference to Figure 1, the movable segment 13 is connected to the support 14 by a parallelogram linkage since the link 41 is parallel to the links 45 and 46, and the pivot pins 42, 51 and 52 are included in a plane which is parallel to another plane which includes pivot pins 39, 47 and 48. This parallelogram linkage permits segment 13 to be moved laterally relative to segment 12 but, during such lateral movement, prevents relative rotation between the segments 12 and 13 and thus maintains each of the faces 22 parallel at all times to each of the faces 21. While the linkage described is preferred, it will be understood that various other connections may be provided to maintain the faces 21 parallel to the faces 22 when the segments 12 and 13 are separated.

Since the segment 13 is cast of heavy metal, it normally descends by gravity until the adjacent ends of links 45 and 46 engage, respectively, adjustable stop bolts 55 and 56 which are threadedly mounted in a horizontal plate 57 which is welded to a pair of upwardly facing shoulders 58 and 59 on plates 26 and 27, respectively. The links 45 and 46 and thus the segment 13 are moved upwardly by the action of a pneumatic cylinder 61 which is connected to a source of fluid pressure (not shown). When fluid pressure is introduced into one end of the cylinder 61, piston rod 62 is moved upwardly to engage the under side of T beam 63 which is provided with end plates 64 and 65 which are welded to links 46 and 46. The plates 26 and 27 are provided, respectively, with side windows 66 and 67 which are aligned with T beam 63.

Figure 5:
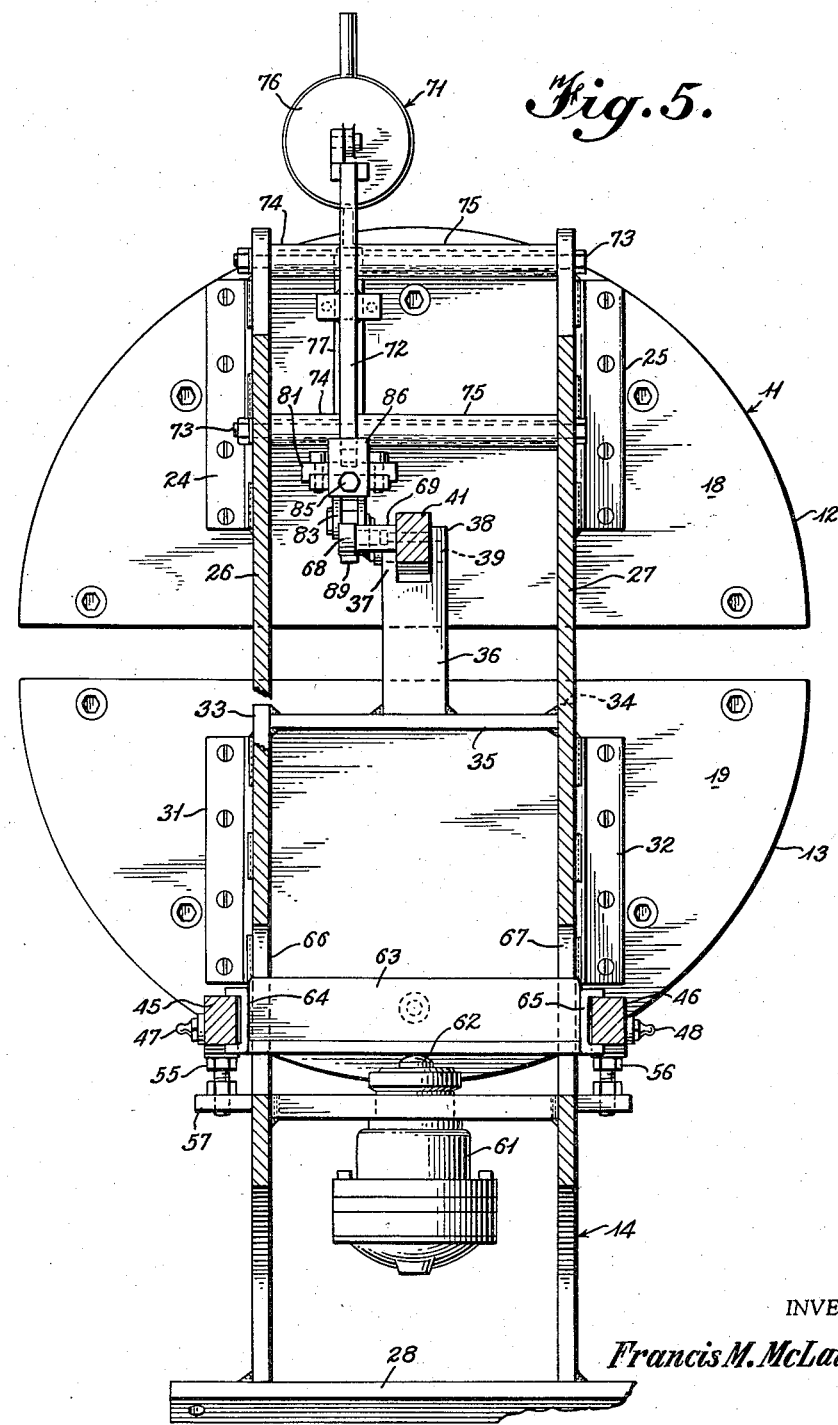
Figure 5 is a sectional view taken in the direction of the arrows along the line 5—5 of Figure 4.

Forming a part of the link 41 is an indicator-actuating roller 68 which is connected to the body of the link 41 by means of bracket 69. As best seen in Figure 5, an indicator assembly 71 is mounted between the plates 26 and 27. A mounting plate 72 is connected between the plates 26 and 27 by means of bolts 73 and is positioned laterally by spacers 74 and 75 which surround the bolts 73. A conventional dial indicator 76 is attached to the mounting plate 72 and is operated by a telescoped actuating rod 77 which is provided with a conventional cushioning mechanism 78. The actuating rod 77 terminates at its lower end in a roller 79. Welded to the lower end of the mounting plate 72 is a downwardly facing channel member 81 with a pair of elongated slots 82 formed therein. A bracket 83 is slideably connected to the under side of the channel member 81 by means of bolts 84 which extend through slots 82. Rigidly bolted to the plate 72 is a bracket 86 in which is threadedly mounted an adjusting screw 85 which engages the base of bracket 83 to effect slideable adjustment thereof. Pivotally connected by means of pin 87 to the lower end of bifurcated bracket 83 is a lever 88 having a lever arm 89 which contacts indicator-actuating roller 68 and a lever arm 91 which contacts indicator roller 79. Thus, when the segment 13 moves downwardly with respect to segment 12, the downward movement of roller 68 will be transmitted through lever 88 and roller 79 into upward movement of the indicator-actuating rod 77 which moves pointer 92 on indicator 76 along scale 93.

The difference between the circumference of the expanded gauge surface and the circumference of the retracted circular gauge surface is equal to twice the distance of separation between the segments 12 and 13. The ratio between (1) the difference in the diameter of a circle having the same diameter as the expanded gauge surface and the diameter of retracted circular surface 20, and (2) the distance of separation between the segments 12 and 13, is equal to $$\frac{2}{\pi}$$

This can be proved mathematically as follows:

Let:
$C_1$ = circumfernce of the bead grommet to be measured
$C_2$ = circumference of the circular gauge surface on which such grommet is mounted
$D_1$ = diameter of such grommet
$D_2$ = diameter of such surface
$L$ = distance of separation between segments Given: $C = \pi D$ and $C_1 - C_2 = 2L$ Then: $\pi D_1 - \pi D_2 = 2L$ $$\frac{D_1 - D_2}{L} = \frac{2}{\pi}$$

Accordingly, the indicator-actuating roller is positioned on the link 41 so that the ratio between (1) the distance from the pivot pin 42 to the roller 68 and (2) the distance from the pivot pin 42 to the pivot pin 39 is equal to $$\frac{2}{\pi}$$

Stated differently, the roller 68 is positioned on the link 41 at a position relatively spaced at a ratio of $$\frac{2}{\pi - 2}$$

from the pivot pins 42 and 39, respectively. Thus, since the pivot pin 39 will be moved a distance equal to the distance of separation between the segments 12 and 13, the roller 68 will be moved a distance equal to the difference in diameter between the gauge surface 20 and a circle having the same circumference as the expanded gauge surface. Accordingly, a direct measurement of the movement of the roller 68 will indicate the difference in such diameters. The indicator-actuating rod 77 is moved upwardly by the lever 88 the same distance that the roller 68 is moved downwardly because the pivot pin 87 on which lever 88 is mounted is normally centered between the rollers 68 and 79 so that the effective lengths of lever arms 89 and 91 will be equal. The pivot pin 87 may be adjusted by rotation of adjusting screw 85 to vary the relative effective lengths of lever arms 89 and 91 to compensate for any variation in the position of roller 68 with respect to the pivot pins 42 and 39. While the specific linkage and indicator arrangements disclosed are preferred, it is obvious that various such arrangements may be provided to impart linear movement to an indicator at such a ratio with respect to the distance of separation of the gauge segments that a direct measurement may be made of the difference between the diameter of the gauge surface 20 and the diameter of a circle having the same circumference as the expanded gauge surface.

In operation, the pneumatic cylinder 61 is actuated to move the piston rod 62 upwardly and thus move the link 45 and the gauge segment 13 into abutting relationship with the gauge segment 12. The tire bead grommet is mounted coaxially on one of the circular surfaces 20 formed by a pair of opposed semi-circular faces 21 and 22. The grommet is normally mounted on the surface 20 which is next smaller than the grommet in diameter. The pneumatic cylinder 61 is then de-actuated and the gauge segment 13 descends by gravity to provide an expanded grommet-engaging surface and to pull the grommet into close conformity with the semi-circular configuration of each of the faces 21 and 22 on which it is mounted. When the grommet is thus pulled taut between the segments 12 and 13, the excess circumference of the grommet extends across each side of the space between the separated segments 12 and 13 in substantially a straight line. As the segment 13 descends, the link 41 pivots about pivot pin 42 to move the indicator-actuating roller 68 downwardly a distance equal to the difference between the diameter of the grommet and the retracted diameter of the surface on which it is mounted. A direct reading of this difference is obtained on the indicator 76 which is responsive to the movement of the roller 68.

It is important that a uniform and predetermined amount of tension be imparted to each bead grommet which is measured. This is accomplished by the weight of the movable segment 13. It is obvious that additional weight may be added to the segment 13 to vary the amount of tension imparted to the grommet. Further, if desired, means such as a fluid pressure cylinder may be connected between the segments 12 and 13 to impart any desired separating force thereto.

When a bead grommet is mounted on one of the circular gauge surfaces 20 of a diameter smaller than the grommet and the segments 12 and 13 are separated to pull the grommet taut therebetween, it is apparent that the grommet is distorted out of its normal circular configuration. Because the grommet is formed of metal wire of limited resilience it will not return to its normal configuration if bent around a surface having a diameter which is too small relative to the diameter of the grommet. It is, therefore, important that the diameter of each measuring surface be sufficiently large with respect to the largest sized grommet to be measured thereon as not to permanently distort the grommet when it is caused to conform to such surface during the measuring operation. The difference between the diameter of each of the circular gauge surfaces 20 and the next larger circular gauge surface must be sufficiently small as not to permanently distort a grommet which is measured on the former surface and which is larger in diameter than such former surface by an amount equal to said difference. The maximum difference between the diameters of adjacent gauge surfaces 20 will, of course, vary depending upon the inherent resilience of the grommets to be measured. A gauge having surfaces 20 uniformly increasing in diameter from the outer end to the inner end of the gauge in increments of one inch has been found to be satisfactory for measuring grommets used in most standard automobile tires. The one inch increment is also desirable because it permits use of an indicator having a one inch capacity.

Throughout this specification, various connections have been described as being welded or bolted. It is obvious that other suitable types of connections may be provided.

The invention has been described with reference to a single preferred specific embodiment. It is apparent that various changes may be made without departing from the scope of the appended claims.

I claim:

1. In an apparatus for measuring tire bead grommets, a gauge comprising a pair of radial segments having equal semi-circular faces together forming a circular grommet-engaging surface slightly smaller in diameter than the grommet to be measured, means connecting said segments for relative radially outward movement to provide an expanded grommet-engaging surface, indicator means fixed with respect to one of said segments, means for actuating said indicator means, and means connected to said gauge for moving said actuating means in response to the expansion of said gauge a distance equal to the difference between the diameter of said circular surface and the diameter of a circle equal in circumference to said expanded surface.

2. In an apparatus for measuring tire bead grommets, support means, a generally horizontal gauge mounted on said support means and comprising a pair of upper and lower segments having equal semi-circular faces together forming a circular grommet-engaging surface slightly smaller in diameter than the grommet to be measured, said upper segment being fixed relative to said support means and said lower segment being vertically movable by gravity to provide an expanded grommet-engaging surface, indicator means fixed with respect to one of said segments, means for actuating said indicator means, and means connected to said gauge for moving said actuating means in response to the expansion of said gauge a distance equal to the difference between the diameter of said circular surface and the diameter of a circle equal in circumference to said expanded surface.

3. In an apparatus for measuring tire bead grommets, support means, a gauge mounted on said support means and comprising a pair of segments having equal semi-circular faces together forming a circular grommet- engaging surface slightly smaller in diameter than the grommet to be measured, one of said segments being fixed relative to said support means and the other of said segments being outwardly movable normal to the interface between said segments to provide an expanded grommet-engaging surface, indicator means fixed with respect to said fixed segment, elongated link means having a first pivotal connection at one end to said support means and a second pivotal connection at the other end to said movable segment, and means for actuating said indicator means carried by said link means at a position relatively spaced at a ratio of $$\frac{2}{\pi-2}$$

from said first and second pivotal connections, respectively, whereby said indicator-actuating means is movable in response to the expansion of said gauge a distance equal to the difference between the diameter of said circular surface and the diameter of a circle equal in circumference to said expanded surface.

4. In an apparatus for measuring tire bead grommets, a generally frusto-conical gauge comprising a pair of radial segments having equal semi-circular faces together forming a plurality of axially spaced circular grommet-engaging surfaces progressively increasing in diameter from the outer end to the inner end of said gauge in small increments, means connecting said segments for relative radially outward movement to provide an expanded grommet-engaging surface, means to restrain said segments from rotating relative to each other during said relative outward movement thereof, and means including an indicator associated with said segments for actuation of said indicator in response to the expansion of said gauge a distance equal to the difference between the diameter of any one of said circular surfaces and the diameter of a circle equal in circumference to the expanded surface corresponding to said one circular surface.

5. In an apparatus for measuring tire bead grommets, a generally frusto-conical gauge comprising a plurality of radial segments having equal arcuate faces together forming a plurality of axially spaced circular grommet-engaging surfaces progressively increasing in diameter from the outer end to the inner end of said gauge in small increments, means connecting said segments for relative radially outward movement to provide a plurality of expanded grommet-engaging surfaces corresponding to said circular surfaces, means to restrain said segments from rotating relative to each other during said relative outward movement thereof, indicator means fixed with respect to one of said segments, means for actuating said indicator means, and means connected to said gauge for moving said actuating means in response to the expansion of said gauge a distance equal to the difference between the diameter of any one of said circular surfaces and the diameter of a circle equal in circumference to the expanded surface corresponding to said one circular surface.

6. In an apparatus for measuring tire bead grommets, support means, a generally frusto-conical gauge mounted on said support means and comprising a pair of segments having equal semi-circular faces together forming a plurality of axially spaced circular grommet-engaging surfaces progressively increasing in diameter from the outer end to the inner end of said gauge in small increments, one of said segments being fixed relative to said support means and the other of said segments being outwardly movable normal to the interface between said segments to provide a plurality of expanded grommet-engaging surfaces corresponding to said circular surfaces, means to restrain said segments from rotating relative to each other during movement of said movable segment, indicator means fixed with respect to said fixed segment, elongated link means having a first pivotal connection at one end to said support means and a second pivotal connection at the other end to said movable segment, and means for actuating said indicator means carried by said link means at a position relatively spaced at a ratio of $$\frac{2}{\pi-2}$$

from said first and second pivotal connections, respectively, whereby said indicator-actuating means is movable in response to the expansion of said gauge a distance equal to the difference between the diameter of any one of said circular surfaces and the diameter of a circle equal in circumference to the expanded surface corresponding to said one circular surface.

7. In an apparatus for measuring tire bead grommets, support means, a generally frusto-conical gauge mounted on a generally horizontal axis on said support means and comprising a pair of upper and lower segments having equal semi-circular faces together forming a plurality of axially spaced circular grommet-engaging surfaces progressively increasing in diameter from the outer end to the inner end of said gauge in small increments, said upper segment being fixed relative to said support means and said lower segment being vertically movable by gravity to provide a plurality of expanded grommet-engaging surfaces corresponding to said circular surfaces, means to restrain said segments from rotating relative to each other during the movement of said movable segment, indicator means fixed with respect to said segments, means for actuating said indicator means, and means connected to said gauge for moving said actuating means in response to the expansion of said gauge a distance equal to the difference between the diameter of any one of said circular surfaces and the diameter of a circle in circumference to the expanded surface corresponding to said one circular surface.

8. In an apparatus for measuring tire bead grommets, support means, a generally frusto-conical gauge mounted on a generally horizontal axis on said support means and comprising a pair of upper and lower segments having equal semi-circular faces together forming a plurality of axially spaced circular grommet-engaging surfaces progressively increasing in diameter from the outer end to the inner end of said gauge in small increments, said upper segment being fixed relative to said support means and said lower segment being vertically movable by gravity to provide a plurality of expanded grommet-engaging surfaces corresponding to said circular surfaces, means to restrain said segments from rotating relative to each other during the movement of said movable segment, indicator means fixed with respect to one of said segments, elongated link means having a first pivotal connection at one end to said support means and a second pivotal connection at the other end to said movable segment, and means for actuating said indicator means carried by said link means at a position relatively spaced at a ratio of $$\frac{2}{\pi-2}$$

from said first and second pivotal connections, respectively, whereby said indicator-actuating means is movable in response to the expansion of said gauge a distance equal to the difference between the diameter of any one of said circular surfaces and the diameter of a circle equal in circumference to the expanded surface corresponding to said one circular surface.

References Cited in the file of this patent
UNITED STATES PATENTS

| | | |
|---|---|---|
| 69,954 | Richards | Oct. 15, 1867 |
| 920,051 | Guerineau | Apr. 27, 1909 |
| 1,515,627 | Shook | Nov. 18, 1924 |
| 2,556,230 | Starbuck | June 12, 1951 |

UNITED STATES PATENT OFFICE

CERTIFICATE OF CORRECTION

Patent No. 2,879,605              March 31, 1959

Francis Marion McLaughlin

It is hereby certified that error appears in the printed specification of the above numbered patent requiring correction and that the said Letters Patent should read as corrected below.

Column 3, line 48, for "links 46" read -- links 45 --; column 8, line 2, for "circle in" read -- circle equal in --.

Signed and sealed this 14th day of July 1959.

(SEAL)
Attest:

KARL H. AXLINE               ROBERT C. WATSON
Attesting Officer             Commissioner of Patents